Feb. 24, 1959 — A. W. GAUBATZ — 2,874,926
COMPRESSOR AIR BLEED-OFF
Filed Dec. 31, 1954 — 2 Sheets-Sheet 1
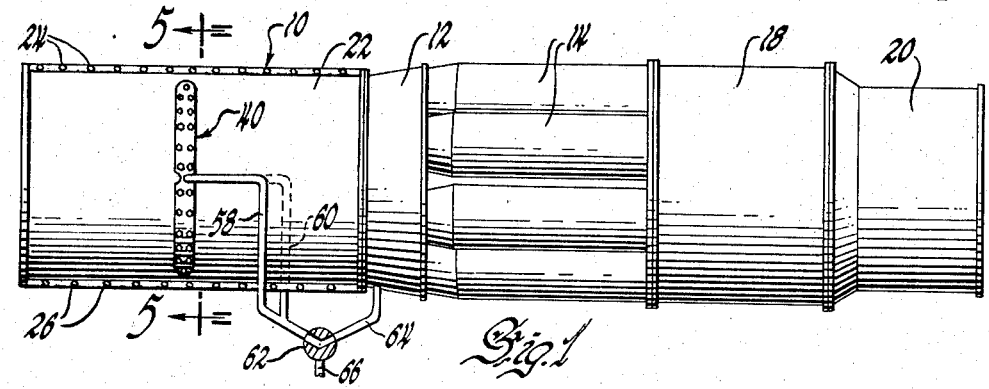
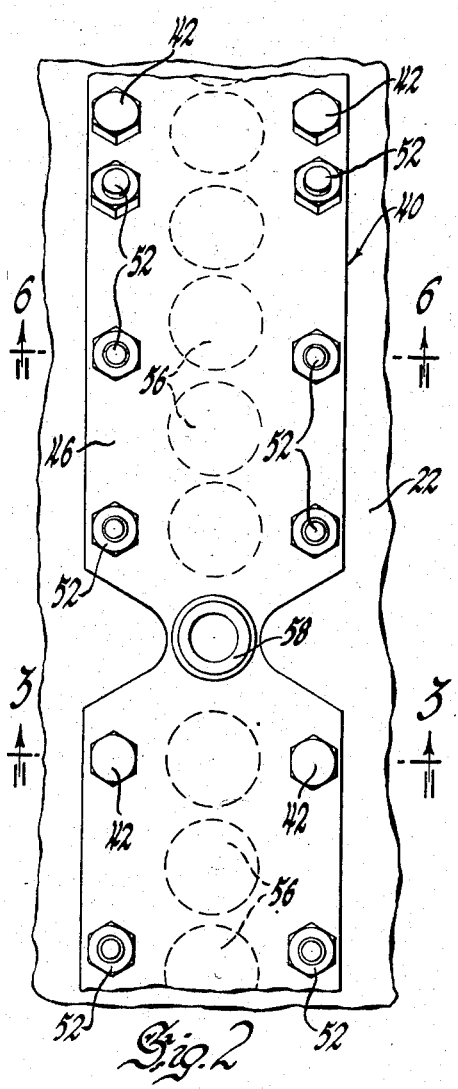
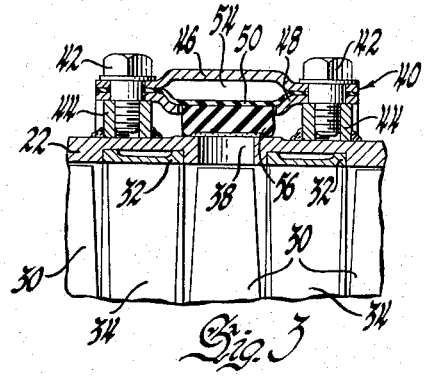
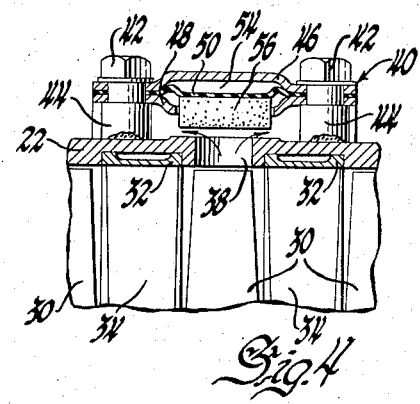
Inventor
Arthur W. Gaubatz
By Paul Fitzpatrick
Attorney Inventor
Arthur W. Gaubatz
By Paul Fitzpatrick
Attorney

United States Patent Office 2,874,926
Patented Feb. 24, 1959

2,874,926

COMPRESSOR AIR BLEED-OFF

Arthur W. Gaubatz, Indianapolis, Ind., assignor to General Motors Corporation, Detroit, Mich., a corporation of Delaware Application December 31, 1954, Serial No. 478,957

1 Claim. (Cl. 251—61)

This invention relates to an axial flow compressor for an aircraft gas turbine engine or the like and more particularly to an air bleed-off valve for the compressor.

When a gas turbine engine utilizes an axial flow compressor with a large number of stages it is desirable to provide some means for bleeding off compressed air at one of the intermediate stages during starting and low speed operation. A gas turbine engine usually operates at a substantially uniform high speed and the compressor and turbine blading of the engine are accordingly designed for high speed operation. A multi-stage axial flow air compressor tends to load up during starting and low speed operation of the engine as the blading is not designed for these operating conditions. Better performance may be had during starting and low speed operation by releasing a portion of the compressed air from an intermediate stage directly to atmosphere.

An object of the invention is to provide a suitable air bleed-off valving arrangement for a high speed multi-stage axial flow air compressor.

Further objects and advantages of the present invention will be apparent from the following description, reference being had to the accompanying drawings, wherein a preferred form of the present invention is clearly shown.

In the drawings:

Figure 1 is a side elevation of an aircraft gas turbine engine incorporating the invention;

Figure 2 is an enlarged partial side elevation of the compressor portion of the engine;

Figure 3 is a partial section through an intermediate stage of the compressor portion of the engine taken substantially on the plane indicated by the line 3—3 of Figure 2;

Figure 4 is a partial section similar to Figure 3;

Figures 5, 6:
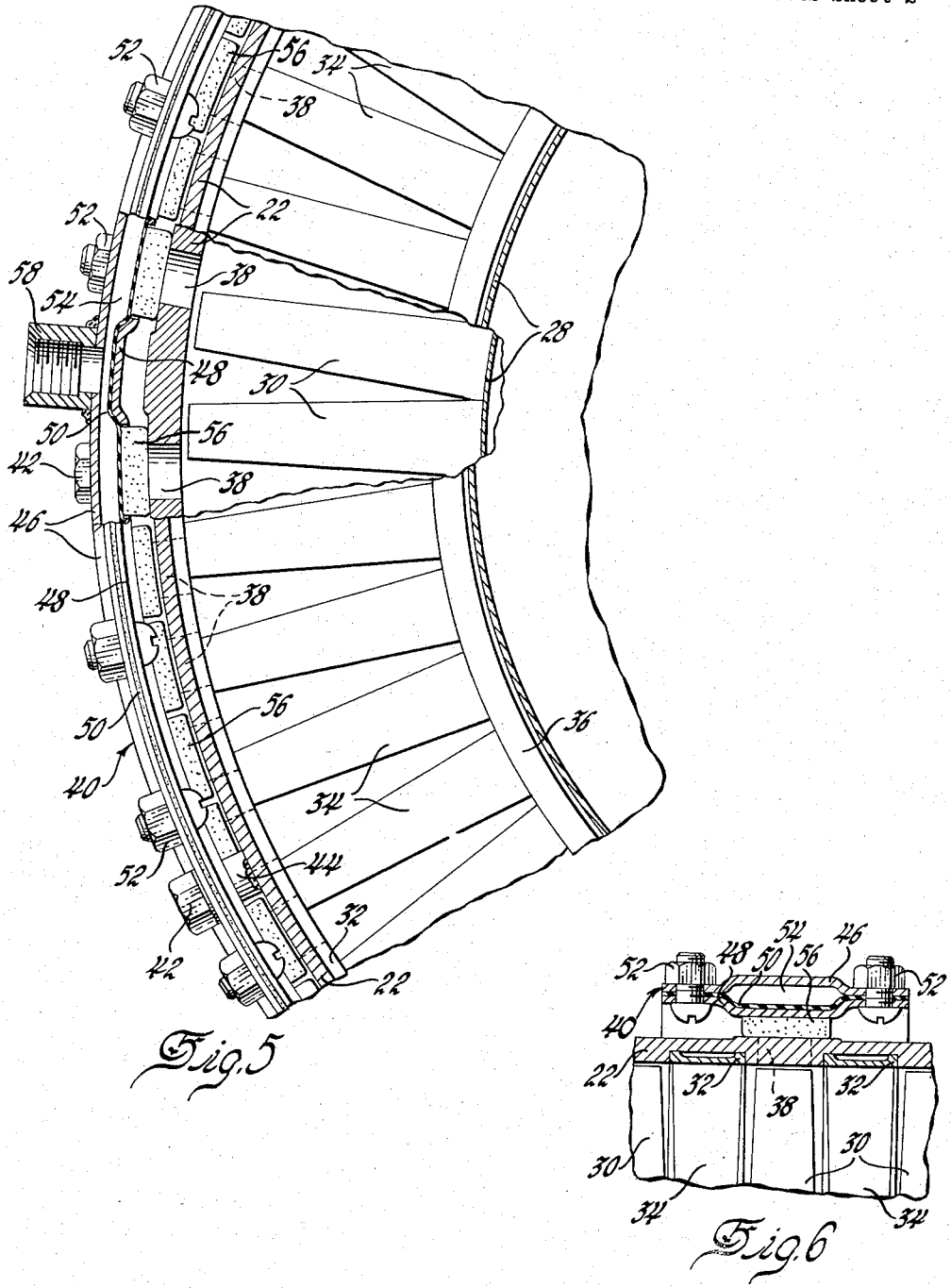
Figure 5 is an enlarged partial section, partially broken away, through the intermediate stage of the compressor taken substantially on the plane indicated by the line 5—5 of Figure 1.
Figure 6 is a partial section through the intermediate stage of the compressor taken substantially on the plane indicated by the line 6—6 of Figure 2.

Referring now to the drawings and more particularly to Figure 1, the gas turbine engine is of a known type and includes a multi-stage axial flow air compressor 10 that discharges through a diffuser 12 into a plurality of cannular combustion chambers 14. An axial flow turbine 18 is drivingly connected to the compressor 10 and receives the products of combustion from the combustion chambers 14 and discharges to atmosphere through an exhaust nozzle 20. As previously noted, it is desirable that compressed air from an intermediate stage be bled off to atmosphere during starting and low speed operation of the engine. Referring additionally to the remaining figures, the compressor 10 includes a cylindrical outer casing that is formed by a pair of arcuate sections 22 that are suitably retained in assembled relation, as by longitudinal bolt rows 24 and 26. A rotor 28 is housed in the casing and carries a plurality of axially spaced, annular rows of blades 30. A plurality of stator vane assemblies are supported on the cylindrical inner surface of the compressor casing in alternating relation with the rows of rotor blades each including a pair of arcuate outer shroud strips 32 each carrying an arcuate row of stator vanes 34 and an arcuate inner shroud strip 36.

An annular row of valve passages 38 in the casing sections 22 extend radially outward from an intermediate one of the rotor blade rows 30 to place the interior of the casing in communication with atmosphere during starting and low speed operation and thereby bleed off pressurized air from an intermediate compression stage. Opening and closing of the valve passages 38 is accomplished by a pair of arcuate valve assemblies 40 which extend around the compressor casing.

Each valve assembly 40 is secured on the exterior of the respective casing section 22 in overlying spaced relation with the valve passages 38 by bolts 42 that thread into projecting casing bushings 44. Each valve assembly includes an arcuate outer wall 46 and an arcuate retainer strip 48 that mount an arcuate flexible inner wall 50 in sandwich relation. Each valve assembly is held in assembled relation by threaded connections, as at 52. The outer walls 46 and retainer strips 48 have facing concave surfaces so that the flexible inner walls 50 form expansible chambers 54 with the outer walls. Each flexible inner wall 50 carries an arcuate row of valve plugs 56 in radially registerable relation with the valve passages 38 and radial bores are provided in each retainer strip 48 to permit free radial movement of the valve plugs.

The expansible chambers 54 communicate through conduits 58 and 60 with a two way valve 62 that connects the chambers to the diffuser 12 by a conduit 64 or to the atmosphere by a conduit 66. The air pressure at the diffuser is higher than the air pressure at the intermediate compression stage and the chambers are inflated to firmly seat the valve plugs 56 over the valve passages 38 during normal high speed engine operation. The chambers are deflated during low speed and starting operations to permit the pressure at the intermediate compression stage to unseat the valve plugs and bleed off to atmosphere.

The valving arrangement of the invention provides high quantity air bleed-off when open due to the large number of valve passages and reduces air leakage to an absolute minimum when closed as the valve plugs are tightly seated against the cylindrical outer surface of the casing by the high compressor discharge pressure. The valve assemblies, the stator vane assemblies and the compressor casing are parted radially into similar arcuate sections to simplify their assembly with the compressor rotor. The simplicity and compactness of the valving arrangement affords improved advantages for aircraft engine design where air space, strength and weight considerations are at a premium and the arrangement is especially adapted for modification of existing compressors not provided with air bleed-offs.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

A valve assembly comprising a casing having an arcuate surface with a row of fluid discharge ports spaced therealong, a row of valve plugs arranged to register with said ports, and means for actuating and supporting and guiding said valve plugs for registration with said ports comprising an arcuate inner wall secured to said casing in spaced and overlying relation with said ports, said inner wall having a row of openings coaxially aligned with said ports, an arcuate outer wall overlying and secured to said inner wall and forming an elongated arcuate chamber therewith, and a flexible diaphragm in said elongated chamber secured between said walls to form an expansible chamber with said outer wall, said valve plugs being secured to said diaphragm to coaxially project through said openings in slidable engagement therewith for guided registration with said ports on pressurization of said expansible chamber, said flexible diaphragm being shielded from the fluid discharge from said ports by said valve plugs and said inner wall.

References Cited in the file of this patent
UNITED STATES PATENTS

| | | |
|---|---|---|
| 710,884 | Parsons | Oct. 7, 1902 |
| 1,603,005 | Flam | Oct. 12, 1926 |
| 2,394,911 | Griswold | Feb. 12, 1946 |
| 2,698,711 | Newcomb | Jan. 4, 1955 |